US010997500B1

(12) United States Patent
Vishnu Narayanan et al.

(10) Patent No.: US 10,997,500 B1
(45) Date of Patent: May 4, 2021

(54) NEURAL NETWORK WITH RE-RANKING USING ENGAGEMENT METRICS

(71) Applicant: Amazon Technologies, Inc., Seattle, WA (US)

(72) Inventors: FNU Vishnu Narayanan, Seattle, WA (US); Oleg Rybakov, Seattle, WA (US); Siddharth Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1017 days.

(21) Appl. No.: 15/603,037

(22) Filed: May 23, 2017

(51) Int. Cl.
*G06N 3/08* (2006.01)
*G06N 5/04* (2006.01)

(52) U.S. Cl.
CPC .............. *G06N 3/08* (2013.01); *G06N 5/04* (2013.01)

(58) Field of Classification Search
CPC ...... G06Q 30/0631; G06N 3/08; G06N 20/00; G06N 3/0454; G06N 3/084; G06N 3/088; G06N 5/003; G06N 5/022; G06N 5/025; H04L 67/22
See application file for complete search history.

(56) References Cited

U.S. PATENT DOCUMENTS

| 9,753,922 | B2 * | 9/2017 | Hausler | G06F 16/24578 |
|---|---|---|---|---|
| 10,635,973 | B1 * | 4/2020 | Dirac | G06N 3/08 |
| 10,650,432 | B1 * | 5/2020 | Joseph | G06N 3/08 |
| 2014/0108395 | A1 * | 4/2014 | Polonsky | G06F 16/335 |
| | | | | 707/733 |
| 2015/0187024 | A1 * | 7/2015 | Karatzoglou | G06Q 50/01 |
| | | | | 705/319 |
| 2017/0185894 | A1 * | 6/2017 | Volkovs | G06N 3/08 |
| 2017/0228810 | A1 * | 8/2017 | Shang | G06Q 30/0631 |
| 2019/0163829 | A1 * | 5/2019 | Puri | G06F 16/9535 |
| 2019/0279231 | A1 * | 9/2019 | Ning | G06Q 30/0202 |

OTHER PUBLICATIONS

Covington, P., et al., Deep Neural Networks for YouTube Recommendations, RecSys '16 Proceedings of the 10th ACM Conference on Recommender Systems, pp. 191-198, Sep. 2016.
Deep Scalable Sparse Tensor Network Engine (DSSTNE) https://github.com/amznlabs/amazon-dsstne, retrieved Sep. 2017.
Chung, Generating Recommendations at Amazon Scale with Apache Spark and Amazon DSSTNE https://aws.amazon.com/blogs/big-data/generating-recommendations-at-amazon-scale-with-apache-spark-and-amazon-dsstne/, Jul. 9, 2016.

(Continued)

*Primary Examiner* — Paulinho E Smith
(74) *Attorney, Agent, or Firm* — Knobbe, Martens, Olson & Bear, LLP

(57) ABSTRACT

The present disclosure is directed to generating neural network (NN) output using input data representing various types of events, such as input representing a certain type of event and also an engagement metric that may be representative of a property of the event or representative of a related but different type of event. For example, the output values generated using the NN may be associated with the likelihood that certain future events will occur, given the occurrence of certain past or current events. The output can then be modified (e.g., re-ranked, adjusted, etc.) based on the occurrence of certain other past or current events.

19 Claims, 6 Drawing Sheets

(56) References Cited

OTHER PUBLICATIONS

Linden, G. et al., Amazon.com recommendations: item-to-item collaborative filtering, IEEE Internet Computing, vol. 7, No. 1, pp. 76-80, Jan. 2003.
Nair, V., et al. Rectified linear units improve restricted Boltzmann machines. ICML, Dec. 2010.
Srivastava, N. et al. Dropout: A simple way to prevent neural networks from overfitting, Journal of Machine Learning Research, vol. 15, pp. 1929-1958, Jun. 2014.

* cited by examiner

NEURAL NETWORK WITH RE-RANKING USING ENGAGEMENT METRICS

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a machine learning model may be implemented as an artificial neural network ("NN"). Artificial neural networks are artificial in the sense that they are computational entities, analogous to biological neural networks in animals, but implemented by computing devices. Output in NN-based models is obtained by doing a "forward pass." The forward pass involves multiplying large NN weight matrices, representing the parameters of the model, by vectors corresponding to input feature vectors or hidden intermediate representations. In certain systems, such as systems designed to provide customized content (e.g., content with recommendations for goods and/or services) to users based on the content interaction histories of the users, NN-based models may generate probability scores via the forward pass using content interaction histories. The probability scores may indicate the probabilities of a user performing some future interaction, such as purchasing or otherwise acquiring items during a time period. The parameters of a NN can be set in a process referred to as training.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1B:
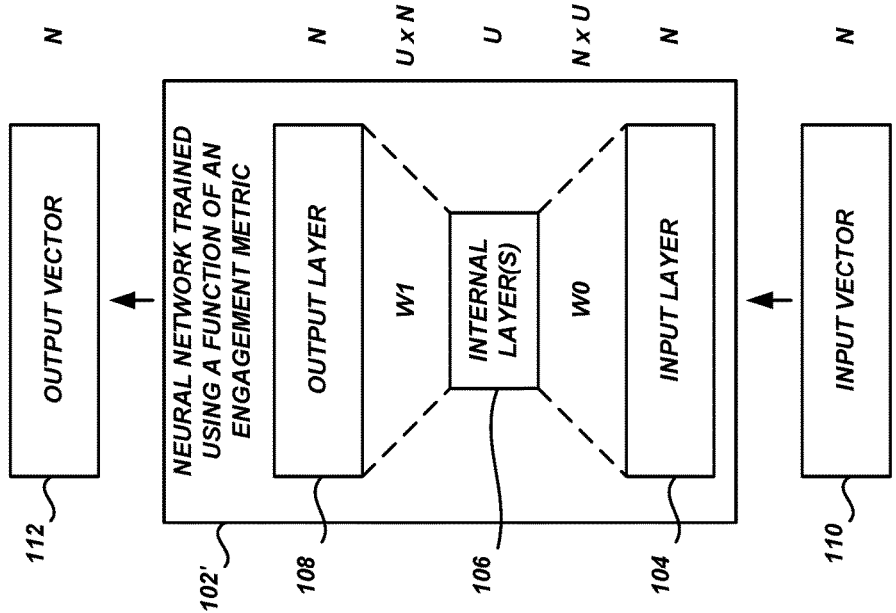
FIG. 1B is a diagram of an illustrative artificial neural network trained using an engagement metric according to some embodiments.

The present disclosure is directed to embodiments of generating neural network (NN) output using input data representing various types of events, such as input representing a certain type of event and also an engagement metric that may be representative of a property of the event or representative of a related but different type of event. For example, the output values generated using the NN may be associated with the likelihood that certain future events will occur, given the occurrence of certain past or current events. The output can then be modified (e.g., re-ranked, adjusted, etc.) based on the occurrence of certain other past or current events. In some embodiments, a NN can be trained to optimize for one metric (e.g., a precision metric). For example, parameters (e.g., weight matrices) of a NN can be set and modified in what amounts to a trial-and-error process until the model produces (or "converges" on) the correct or preferred output for input regarding certain types of events. Such a model can have a high precision (or another accuracy measurement). However, such a model does not account for certain other types events, or for other measurements of user engagement generally. In some embodiments, user engagement can be represented as a business value associated with one item of a plurality of items that a user can interact with. Illustratively, user engagement can represent a viewing duration with respect to an item, a listening duration with respect to an item, a watching duration with respect to an item, an interaction with content regarding the item (e.g., clicking on an image representing the item), or any combination thereof.

In one specific, non-limiting embodiment, a machine learning model can be trained to optimize for one metric, such as the generation of personalized item recommendations optimized for recommending the items most likely to be acted upon (e.g., purchased) by a user. After the machine learning model is trained, the output of the machine learning model can be modified and re-ranked such that the modified output is optimized for both the metric used in training and another metric. This second metric can be an engagement metric which can capture user engagement (e.g., usage) associated with the various items that may be recommended. In some embodiments, the engagement metric can include one or more engagement parameters, such as one each for one or more items under consideration for recommendation. In some embodiments, the machine learning model can be associated with one or more hyperparameters, which can be used to modify the engagement metric prior to the output of the machine learning model is modified. Thus, recommendations for users can be based on the modified output of the machine learning model. Advantageously, by modifying and re-ranking values of elements of an output vector of the machine learning model, recommendations for a user can be tailored to optimized for both precision (e.g., the items most likely to be purchased by the user) and the engagement metric (e.g., the length of time the user uses or otherwise engages with the items), without having to retrain the NN. The balance between precision and user engagement can be modified by modifying the hyperparameters associated with the machine learning model. In one illustrative, non-limiting embodiment, a machine learning model can be trained using a weighted cross-entropy loss function to optimize for both precision and engagement. With such a model, no re-ranking would be necessary.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, certain aspects of the disclosure will be described using a particular machine learning model, such as a NN, for purposes of illustration only. For brevity, these aspects may not be described with respect to each possible machine learning model that may be used. In practice, however, many or all of the aspects of the disclosure may apply to other machine learning models, including but not limited to those described herein. Examples of machine learning models that may be used with aspects of this disclosure include classifiers and non-classification machine learning models, artificial neural networks (NNs), linear regression models, logistic regression models, decision trees, support vector machines (SVMs), Naïve or a non-Naïve Bayes network, k-nearest neighbors (KNN) models, k-means models, clustering models, random forest models, or any combination thereof.

Example Artificial Neural Network

Figure 1A:
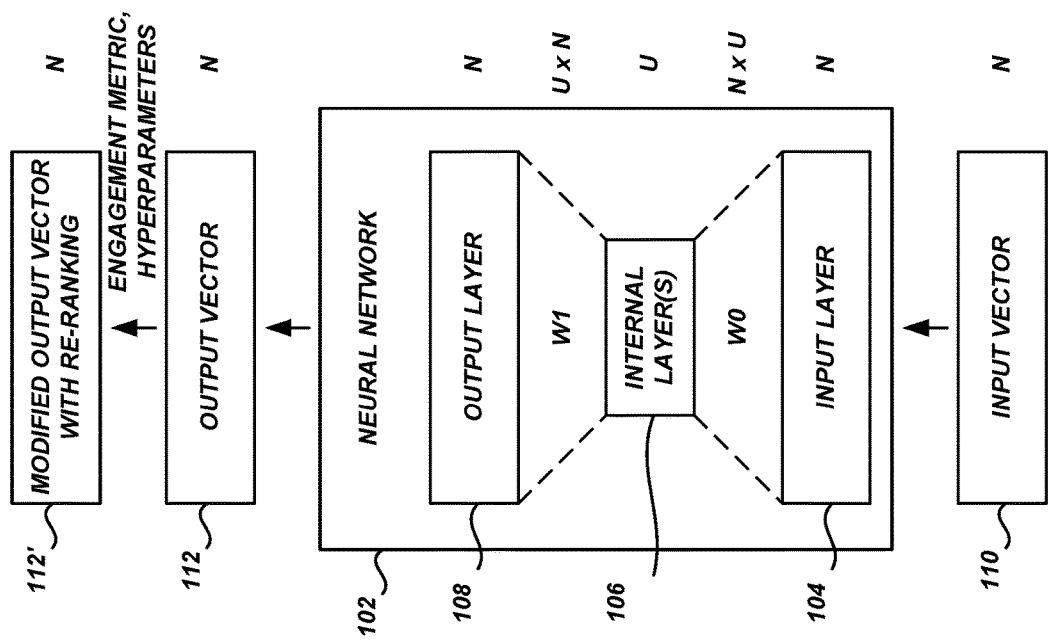
FIG. 1A is a diagram of an illustrative artificial neural network with an output vector modified by re-ranking according to some embodiments.

FIGS. 1A and 1B illustrate example NNs that may be used in some embodiments to predict the occurrence of events based on, e.g., data regarding the prior occurrence of various events, engagement metrics, and the like. Generally described, NNs, including but not limited to deep neural networks ("DNNs"), have multiple layers of nodes. Illustratively, a NN may include an input layer, an output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. When a NN is used to process input data in the form of a matrix of input vectors (e.g., a batch of training data input vectors), the NN may perform a "forward pass" to generate a matrix of output vectors. The input vectors may each include N separate data elements or "dimensions," corresponding to the N nodes of the NN input layer (where N is some positive integer). Each data element may be a value, such as a floating-point number or integer. The forward pass includes multiplying the matrix of input vectors by a matrix representing the weights associated with connections between the nodes of the input layer and nodes of the next layer, and applying an activation function to the results. The process is then repeated for each subsequent NN layer.

The parameters of a NN can be set in a process referred to as training. For example, a NN may be designed for item recommendation generations. The NN may be trained using training data that include purchase histories of existing items. The trained NN may perform item recommendation generations for the existing items based on the purchase histories of users of the existing items. For example, a NN-based model can be trained using training data that includes input data and the correct or preferred output of the model for the corresponding input data. The NN can repeatedly process the input data, and the parameters (e.g., the weight matrices) of the NN can be modified in what amounts to a trial-and-error process until the model produces (or "converges" on) the correct or preferred output.

FIG. 1A is a diagram of an illustrative artificial neural network with an output vector modified by re-ranking according to some embodiments. As shown, the example NN 102 has an input layer 104 with a plurality of nodes, one or more internal layers 106 with a plurality of nodes, and an output layer 108 with a plurality of nodes. In some embodiments, as shown, the input vectors 110 and/or the output vectors 112 may each include N separate data elements or "dimensions" (where N is some positive integer). The NN input layer 104 may include N nodes of the NN input layer 104. In some embodiments, the input vector 110 can include data representing behavior information of a user with respect to a plurality of items, or data representing actual occurrences or probabilities of occurrences of other events. An output vector 112 can include N elements. Each data element of the output vector 112 may be a value, such as a floating-point number or integer. In some embodiments, the elements of the output vector 112 can correspond to a probability of the occurrence of some event, such as a user purchasing an item or performing some other action during a subsequent time period.

Input to a NN, such as the NN 102 shown in FIG. 1A, occurs at the input layer 104. A single input to the NN 102 may take the form of an input vector with N data elements, where N is the number of nodes in the input layer 104. The connections between individual nodes of adjacent layers each is associated with a trainable parameter, or weight, that is applied to the value passed from the prior layer node to the activation function of the subsequent layer node. The weights associated with the connections from the input layer 104 to the internal layer 106 it is connected to may be arranged in a weight matrix W0 with a dimension of N×U, where N denotes the dimensionality of the input layer 104 and U denotes the number of nodes in an internal layer 106. The weights associated with the connections from the internal layer 106 (or, if the NN 102 has multiple internal layers, the internal layer that is adjacent to the output layer 108) to the output layer 108 may be arranged in a weight matrix W0, similar to the weight matrix W0. The weight matrix W1 has a dimension of U×N, where U denotes the number of nodes in the internal layer 106 and N denotes the dimensionality of the output layer 108. The model size of the NN 102, in terms of the number of weights, may be 2×U×N.

The specific number of layers shown in FIG. 1A is illustrative only, and is not intended to be limiting. In some NNs, different numbers of internal layers and/or different numbers of nodes in the input, internal, and/or output layers may be used. For example, in some NNs the layers may have hundreds or thousands of nodes. As another example, in some NNs there may be 1, 2, 4, 5, 10, or more internal layers. In some implementations, each layer may have the same number or different numbers of nodes. For example, the internal layers 106 can include the same number or different numbers of nodes as each other. As another example, the input layer 104 or the output layer 108 can each include more nodes than the internal layers 106. The input layer 104 and the output layer 108 of the NN 102 can include the same number or different numbers of nodes as each other.

In some embodiments, the input vector 110 of the NN 102 can include data representing behavior and/or other event-based information of a user with respect to a plurality of items. For example, the elements of the input vector 110 can include a purchase history, viewing history, or interaction history of a user. As another example, the individual elements of the input vector 110 may correspond to individual items a user can purchase, view, or interact with, and the individual elements can have values of 0 or 1, where 0 represents the user not having purchased an item during a time period and 1 represents the user having purchased the item during the time period. The history of the user during the time period, such as a day, a week, a month, a year, or several years, can be used to determine a probability of the user purchasing items during a subsequent time period, which may be the same length or of a different length than the purchase history time period. As another example, the elements of the input vector 110 can be 0 or a positive integer, where 0 represents the user not having purchased an item during a time period and a positive integer represents a number of times that the user purchased, viewed, or interacted with the item during the time period. In some embodiments, the elements of the input vector 110 can include non-behavior information associated with items. For example, the non-behavior information associated with items can include features of items purchased by the user. Features of items purchased can include a numeric or alphanumeric identifier of the items, a description of the items, the cost of the items, a life expectancy of the items, a category of the items, whether the items are fungible, and/or other characteristics of the items. In some embodiments, the elements of the input vector 110 can include the attributes of the user. For example, the attributes can include the user's age, gender, geographic location, interests, etc. In some embodiments, the input vector 110 can include information other than the specific examples described herein, some combination of different types of information, etc.

Each data element of the output vector 112 may be a value, such as a floating-point number or integer. In some embodiments, the elements of the output vector 112 can represent, correspond to, or otherwise be associated with a probability of occurrence of an event (e.g., the user purchasing, viewing, or interacting with items or representations of items) during a subsequent time period. For example, the values of elements of the output vector 112 can be 0 or any positive number, representing or otherwise associated with the predicted probability of the user interacting with an item during the subsequent time period. Without re-ranking, if a value is greater than some predetermined or dynamically determined threshold, a computing system using the output of the NN 102 can predict that the user will likely purchase the item during the subsequent time period. In some embodiments, the items associated with the top n values (where n is some positive integer, ratio, or percentage) can be selected, based on an ordering of the items by their respective output values. The values of individual elements may not represent actual probabilities of individual events, but may nevertheless representative relative probabilities of individual events with respect to other events. For example, an output vector element value corresponding to event A may be higher than an output vector element value corresponding to event B, and may therefore indicate that A is more likely to occur than B, even though the actual element values are not probabilities.

A computing system, such as the computing system 600 shown in FIG. 6 and described in greater detail below or some other computing system, may deploy a NN 102 for use in a production computing environment. As shown, the NN 102 may determine a value indicative of a probability of purchase of an item by a user based on a purchase history of the user with respect to another item. In one embodiment, the input vector 110 of the NN 102 would be provided to a computer processor that stores or otherwise has access to the weight matrix W0. The processor would then multiply the input vector 110 of the NN 102 by the weight matrix W0 to produce an intermediary vector. The processor may adjust individual values in the intermediary vector using an offset or bias that is associated with the internal layer 106 of the NN 102 (e.g., by adding or subtracting a value separate from the weight that is applied). In addition, the processor may apply an activation function to the individual values in the intermediary vector (e.g., by using the individual values as input to a sigmoid function or a rectified linear unit (ReLU) function). The processor may multiply the intermediary vector by the weight matrix W1 to generate the output vector 112 of the NN 102. The processor may adjust individual values of the multiplication result using an offset or bias that is associated with the output layer 106 of the NN 102 to generate the output vector 112 of the NN 102. In addition, the processor may apply an activation function to the individual values of the multiplication result, after applying an offset or bias to each individual value of the multiplication result, if any, to generate the output vector 112 of the augmented NN 102. Elements of the output vector 112 of the NN 102 may be real numbers in the range [0, 1]. Such real numbers may also be referred to as analog values.

In some implementations, the NN 102 can be defined by equations [1]-[2] below.

$$A_1 = \text{Activation}(W_0 \cdot A_0 + B_0); \text{ and} \quad [1]$$

$$\hat{Y} = \text{Sigmoid}(W_1 \cdot A_1 + B_1); \quad [2]$$

where $A_0$ denotes the input vector 110; $W_0$ denotes the weight matrix that includes the weights associated with the connections from the input layer 104 to the internal layer 106; $B_0$ denotes an offset or a bias that is associated with the internal layer 106 of the NN 102; Activation(*) denotes an activation function, such as a Relu or a sigmoid function; $A_1$ denotes the output of the input layer 104 or the input of the internal layer 106; $W_1$ denotes the weight matrix that includes the weights associated with the connections from the internal layer 106 to the output layer 108; $B_1$ denotes an offset or a bias that is associated with the output layer 108 of the NN 102; Sigmoid(*) denotes a sigmoid function; and Y denotes the output vector 112.

The values of elements of the output vector 112 can be modified and re-ranked using an engagement metric and one or more hyperparameters to generate a modified output vector with re-ranking. The engagement metric can capture user engagement (such as a business value associated with an item or user interaction with the item). The engagement metric (or one or more values derived therefrom using a transformation or some other function) can be represented in some embodiments as a value, or as vector that includes engagement parameters, such as one parameter associated with each item of a plurality of items. For example, the engagement metric can include an engagement parameter that represents a business value associated with one item of the plurality of items. As another example, the engagement metric can be a vector that includes an engagement parameter that represents a viewing duration with respect to an item, a listening duration with respect to an item, a watching duration with respect to an item, an interaction with content regarding the item (e.g., clicking on an image representing the item), or any combination thereof. An engagement parameter can be a real number or an integer. The hyperparameters can be associated with the NN 102. The value of an element of the output vector 112 can be modified or re-ranked using equation [3] below.

$$Fe(i) = \begin{cases} m + u \cdot E(i), & E(i) > 0; \\ 1, & \text{otherwise} \end{cases} \quad [3]$$

where E denotes an engagement metric vector; E(i) denotes an engagement parameter of the engagement metric vector E for an item with an index of i; m and u denote hyperparameters associated with the NN 102; Fe denotes a modification metric; and Fe(i) denotes a modification parameter of the modification metric associated with an item with an index of i. A value of an element of the output vector 112 with respect to an item i can be modified by a modification parameter associated with the item i. For example, the value can be modified by multiplying it with the modification parameter. The modification metric shown in equation [3] is for illustration only, and is not intended to be limiting. In some embodiments, the modification metric can have a linear form (such as that shown in equation [3]), a quadratic form, or a higher order form. The two hyperparameters shown in equation [3] are illustrative only, and are not intended to be limiting. In some embodiments, the NN 102 can be associated with 0, 1, 2, 3, 4, 5, or more hyperparameters to control the effect of the engagement parameter on the output of the NN, or to otherwise affect the output of the NN.

Table 1 illustrates an example of modifying and re-ranking values of elements of the output vector 112. In the example shown in Table 1, the input vector 110 can include at least three elements, each representing a behavior or event of a user with respect to one of items 1, 2, and 3. The output vector 112 can include at least three elements ($\hat{y}_i$, where i=1, 2, or 3) denoting item 1, 2, or 3) each representing or be associated with a predicted probability of the user interacting with items 1, 2, and 3. Table 1 shows that predicted probabilities of the user interacting with items 1, 2, and 3 are 0.9, 0.5, and 0.1. The predicted probabilities associated with the user with respect to items 1, 2, and 3 have ranks of 1, 2, and 3. If the item associated with the top probability value (or rank of 1) is to be recommended, then item 1 would be recommended.

TABLE 1

Example Re-Ranking with Hyperparameters

| Item | $\hat{y}_i$ | Rank | m | u | E(i) | Fe(i) | $\hat{y}_i$ * Fe(i) | Rank after Re-Ranking |
|---|---|---|---|---|---|---|---|---|
| Item 1 | 0.9 | 1 | 0 | 1 | 1 | 1 | 0.9 | 2 |
| Item 2 | 0.5 | 2 | 0 | 1 | 1 | 1 | 0.5 | 3 |
| Item 3 | 0.1 | 3 | 0 | 1 | 10 | 10 | 1 | 1 |
| . | . | . | . | . | . | . | . | . |
| . | . | . | . | . | . | . | . | . |
| . | . | . | . | . | . | . | . | . |

Continuing with the example shown in Table 1, values of the elements of the output vector 110 can be re-ranked. For example, the values of the elements of the output vector 110 can be re-ranked using the engagement metric E and the hyperparameters m and u, in the form of the modification metric shown in equation [3]. The engagement parameters E(i) for items 1, 2, and 3 can be 1, 1, and 10 respectively. The hyperparameters m and u can have values of 0 and 1 respectively. Accordingly, the modification parameters Fe(i) for items 1, 2, and 3 can be 1, 1, and 10 respectively. Values of elements of the output vector 112 can be modified by multiplying with their respective modification parameters Fe(i). Table 1 shows that modified values of elements of the output vector 112 with respect to items 1, 2, and 3 are 0.9, 0.5, and 10. The modified values with respect to items 1, 2, and 3 have ranks of 2, 3, and 1. If the item associated with the top probability value (or rank of 1) is to be recommended, then item 3 would be recommended.

In some embodiments, an artificial neural network can include an output layer modified for re-ranking. The NN can be similar to the NN 102 shown in FIG. 1A. However, the output layer 108 of the NN 102 can be modified into a modified output layer such that the output of the modified NN is a modified output vector. The modified NN can be defined by equation [1] above and equation [2'] below.

$$\hat{y}_i = \text{Sigmoid}(W_1(i) \cdot A_1 + B_1) * Fe(i), \quad [2']$$

where $A_2$ denotes the output of the input layer 104 or the input of the internal layer 106; $W_2(i)$ denotes weight elements of the weight matrix $W_2$ associated with the connections from the internal layer 106 to an element of the output layer 108 associated with an item with index i; $B_2$ denotes an offset or a bias that is associated with the output layer 108 of the NN 102; Sigmoid(*) denotes a sigmoid function; and $\hat{y}_i$ denotes an element of the output vector 112 associated with an item with index i.

Advantageously, by modifying and re-ranking values of elements of the output vector 112 (shown in FIG. 1A), recommendations for a user can be tailored to optimized for both precision and the engagement metric (e.g., by changing the hyperparameters). The balance between precision and the engagement metric can be modified using the hyperparameters without having to retrain the NN 102. For example, precision may be more important than user engagement during one time period while user engagement may be more important in another time period. Furthermore, by modifying the NN 102 to generate a modified NN with a modified output layer, a computing system, such as the computing system 600 shown in FIG. 6 and described in greater detail below or some other computing system, may deploy the modified NN for use in a production computing environment without being aware of the re-ranking implemented.

FIG. 1B is a diagram of an illustrative artificial neural network 102' trained using an engagement metric according to some embodiments. A NN 102', which may be similar to the NN 102 shown in FIG. 1A, can have an input layer 104 with a plurality of nodes, one or more internal layers 106 with a plurality of nodes, and an output layer 108 with a plurality of nodes. In some embodiments, as shown, the input vectors 110 and/or the output vectors 112 may each include N separate data elements or "dimensions" (where N is some positive integer). The NN input layer 104 may include N nodes of the NN input layer 104. In some embodiments, the input vector 110 can include data representing behavior information of a user with respect to a plurality of items, or data representing actual occurrences or probabilities of occurrences of other events. An output vector 112 can include N elements. Each data element of the output vector 112 may be a value, such as a floating-point number or integer. In some embodiments, the elements of the output vector 112 can correspond to a probability of the occurrence of some event, such as a user purchasing an item or performing some other action during a subsequent time period. The NN 102' can be trained using an engagement metric. For example, a parameter of the NN 102' can be updated using a weighted cross-entropy loss function during the training process. In some embodiments, the weighted cross-entropy loss function can be based on (1) a difference between the training data output vector and the reference data output vector and (2) an engagement parameter or a function of an engagement parameter.

Example Process for Re-Ranking an Output Vector of a Machine Learning Model

Figure 2:
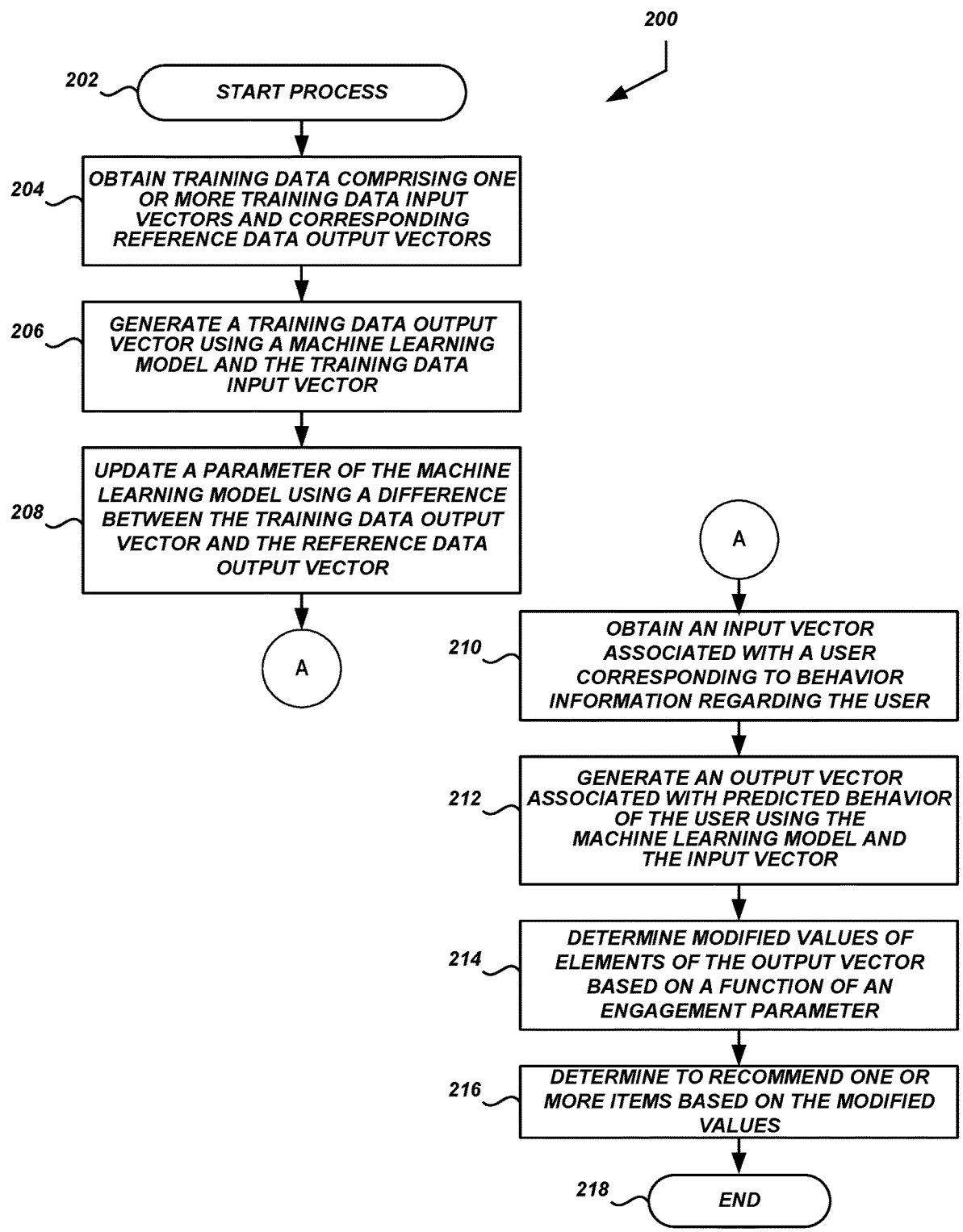
FIG. 2 is a flow diagram of an illustrative process for training and using a machine learning model and modifying an output vector of the machine learning model using an engagement metric for re-ranking elements of the output vector according to some embodiments.

FIG. 2 is a flow diagram of an illustrative process for training and using a machine learning model and modifying an output vector of the machine learning model using an engagement metric for re-ranking elements of the output vector according to some embodiments. The process 200 begins at block 202. The process 200 may be embodied in a set of executable program instructions stored on a computer-readable medium, such as one or more disk drives, of a computing system, such as the computing system 600 shown in FIG. 6 and described in greater detail below. When the process 200 is initiated, the executable program instructions can be loaded into memory, such as RAM, and executed by one or more processors of the computing system 600. Although the process 200 is described with respect to the computing system 600 shown in FIG. 6, the description is illustrative only and is not intended to be limiting. In some embodiments, the process 200 or portions thereof may be performed serially or in parallel by multiple computing systems.

At block 204, the computing system 600 or some other computing system can in some embodiments obtain training data for use in training a machine learning model, such as the NN 102 shown in FIG. 1A. For example, the training data may include input vectors that include feature data for a recommendation process to be performed (e.g., item recommendation generation) or a recognition process to be performed (e.g., automatic speech recognition, facial recognition, handwriting recognition, etc.). Each training data input vector may be associated with a reference data output vector, which is a correct or otherwise expected output. Element of a training data input vector can correspond to data representing a purchase history of a user with respect to a plurality of existing items (e.g., items with available behavior information of users). In some embodiments, the training data can include a plurality of training data input vectors and their corresponding reference data output vectors.

At block 206, the computing system 600 or some other computing system can in some embodiments generate a training data output vector using the machine learning model and the training data input vector (or generate training data output vectors using the machine learning model and the training data input vectors). For example, the computing system 600 can generate a training data output vector from a training data input vector. The training data input vector and the training data output vector may have the same or different dimensions. The corresponding reference data output vector can be used during the training process to determine how accurate the machine learning model is in processing the training data input vector.

In some embodiments, sets of training data input vectors (e.g., "mini batches") may be arranged as input matrices. Each row of an input matrix may correspond to an individual training data input vector, and each column of the input matrix may correspond to an individual node of the input layer 104 of the NN 102. The data element in any given input vector for any given node of the internal layer 104 may be located at the corresponding intersection location in the weight matrix W0. For example, the training data can represent on-demand video purchase and view histories. There can be 100,000 videos available for purchase or view. Thus, the dimensionality of the training data input vectors and reference data output vectors can be 100,000.

At block 208, the computing system 600 or some other computing system can in some embodiments update a parameter of the machine learning model based on a difference between the training data output vector generated at block 206 and the reference data output vector (or differences between training data output vectors and reference data output vectors). Each training data input vector may be associated with a single correct or expected classification, e.g., the corresponding reference data output vector. The goal of training may to minimize the difference between a training data output vector and the reference data output vector. In some embodiments, the computing system 600 may compute the difference using a loss function, such as a cross-entropy loss function, a L2 Euclidean loss function, a logistic loss function, a hinge loss function, a square loss function, or a combination thereof. An example cross-entropy loss function is shown in equations [4]-[5] below.

$$\text{loss}=\text{Cost}(Y,\hat{Y})+\lambda \cdot \Sigma_{i=0}^{L}|W_i|^2; \text{ and} \quad \quad \text{equation [4]}$$

$$\text{Cost}(Y,\hat{Y})=-\Sigma_{i=0}^{N-1}((y_i \cdot \log(\hat{y}_i)+(1-y_i) \cdot \log(1-\hat{y}_i))); \quad \text{equation [5]}$$

where Y denotes a reference data output vector, $\hat{Y}$ denotes a training data output vector, $\lambda$ denotes a weighing factor, and L denotes the number of weight matrices associated with the machine learning model less one. In some embodiments, the machine learning model may be unaware of user engagement (e.g., represented as an engagement metric) such that optimizing the machine learning model for precision and user engagement may not be possible.

To update a parameter of the machine learning model, the computing system 600 can in some embodiments compute a gradient based on the difference between the training data output vector and the reference data output vector (or differences between the training data output vectors and the reference data output vectors). For example, a derivative, or "gradient," can be computed that corresponds to the direction in which each parameter of the machine learning model is to be adjusted in order to improve the model output (e.g., to produce output that is closer to the correct or preferred output for a given input). The computing system 600 can update some or all parameters of the machine learning model using a gradient descent method. In one embodiment, parameters of the machine learning model (e.g., the weights of the model) are updated using back propagation. In back propagation, a training error is determined using a loss function, and the training error may be used to update the individual parameters of the machine learning model in order to reduce the training error. A gradient may then be computed for the loss function to determine how the weights in the weight matrices are to be adjusted to reduce the error. The adjustments may be propagated back through the NN 102 layer-by-layer. Some example processes for training a NN are described in commonly-owned U.S. patent Ser. No. 14/087,852 titled "DISTRIBUTED TRAINING OF MODELS USING STOCHASTIC GRADIENT DESCENT" and filed on Nov. 22, 2013, the disclosure of which is incorporated by reference herein in its entirety. The computing system 600 can in some embodiments determine whether termination criteria are met. For example, the termination criteria can be based on the accuracy of the machine learning model as determined using the loss function. If so, the process 200 can terminate the training process of the machine learning model and proceed to block 210.

At block 210, the computing system 600 or some other computing system can in some embodiments generate or obtain an input vector (e.g., an input vector that corresponds to behavior information) for the machine learning model. The input vector can each include N separate data elements or "dimensions" (where N is some positive integer). The input layer of the machine learning model can include N nodes. In some embodiments, the input vector can include data representing behavior information of a user with respect to a plurality of items, or data representing actual occurrences or probabilities of occurrences of other events. For example, an element of the output vector can correspond to data representing a type or property of behavior of a user with respect to an item.

At block 212, the computing system 600 or some other computing system can in some embodiments generate an output vector using the machine learning model and the input vector. For example, the machine learning model may generate an output vector with each element being an analog value in the range of [0, 1] from an input vector with each element being 0 or 1. The output vector can include N elements. Each data element of the output vector may be a value, such as a floating-point number or integer. In some embodiments, the elements of the output vector can correspond to a probability of the occurrence of some event, such as a user purchasing an item or performing some other action during a subsequent time period. For example, an element of the output vector can correspond to a probability of interaction with content regarding an item of a plurality of items. In some embodiments, the values of individual elements may not represent actual probabilities of individual events, but may nevertheless representative relative probabilities of individual events with respect to other events. For example, an output vector element value corresponding to event A may be higher than an output vector element value corresponding to event B, and may therefore indicate that A is more likely to occur than B, even though the actual element values are not probabilities.

At block 214, the computing system 600 or some other computing system can in some embodiments determine modified values of the element of the output vector based at least in part on an engagement metric. For example, the computing system 600 or some other computing system can generate an engagement metric vector based at least in part on a type or property of behavior of one or more users with respect to items. The engagement metric can be the engagement metric $E(i)$ in equation [3]. The engagement metric vector can include an engagement parameter that represents a business value associated with one item of the plurality of items. Alternatively, or in addition, the engagement metric vector can include an engagement parameter that represents a viewing duration with respect to an item, a listening duration with respect to an item, a watching duration with respect to an item, an interaction with content regarding the item (e.g., clicking on an image representing the item), or any combination thereof. In some embodiments, an engagement parameter can be or relate to a financial value, such as expected revenue, expected profits, etc. In some embodiments, the computing system 600 or some other computing system can compute a transformation or some other function of an engagement metric based at least in part on a type or property of behavior of one or more users with respect to items. For example, the computing system 600 can apply a quadratic function or a sigmoid function to a previously determined engagement metric or parameter. Thus, when determining modified values of an output vector element based at least in part on an engagement metric, the computing system may be using the engagement metric directly, or may be using a value derived therefrom using a transformation or other function.

In some embodiments, computing system 600 or some other computing system can determine modified values of elements of the output vector based at least in part on an engagement metric and one or more hyperparameters of the machine learning model. For example, values of elements of the output vector can be modified and re-ranked using the modification metric $Fe(i)$ shown in equation [3], which is based on the engagement metric $E(i)$ and two hyperparameters m and u.

At block 216, the computing system 600 or some other computing system can in some embodiments determine to recommend one or more items based at least partly on the modified values. For example, as illustrated with reference to Table 1, an output vector can include three elements corresponding to predicted probabilities of a user interacting with items 1, 2, and 3. Before being modified or re-ranked, the three elements can have values of 0.9, 0.5, and 0.1. Without re-ranking, the top item to be recommended would be item 1. Modified values of the three elements can be 0.9, 0.5, and 1 respectively. With re-ranking, the top item to be recommended would be item 3. In some embodiments, the items recommended can be associated with modified values that are above a recommendation threshold. Alternatively, or in addition, the items recommended can be the items with top n modified values. In some embodiments, if a user has interacted with an item, the item is not recommended to the user even if the item is associated with a high modified value. The process 200 ends at block 218.

In some embodiments, the machine learning model can be modified to include a modified output layer. With such a modified machine learning model, the output vector of the modified machine learning model is already modified using an engagement metric and one or more hyperparameters associated with the machine learning model. Accordingly, the process 200 can proceed from block 212 directly to block 216 to determine to recommend one or more items based on the modified values of the output vector of the modified machine learning model.

Although the steps of the process 200 are shown to be performed sequentially in FIG. 2, this order is illustrative only, and is not intended to be limiting. The process 200 or portions thereof may be performed serially or in parallel by one or more computing systems. In some embodiments, the process 200 can comprise two processes: one process comprising the steps illustrated in blocks 202-208, and another process comprising the steps illustrated in blocks 210-216. The two processes can be performed sequentially, in parallel, synchronously, or asynchronously. The two processes may be performed independently of each other. In some embodiments, one process may be performed once while the other process may be performed multiple times. For example, the process comprising the steps shown in blocks 202-208 may be performed daily or weekly (e.g., when new behavior information becomes available), while the process comprising the steps shown in blocks 210-216 may be performed more or less frequently (e.g., each time a user accesses a network resource, which may occur thousands of times or more per day, blocks 210-216 may be executed to generate recommendations).

Figure 3:
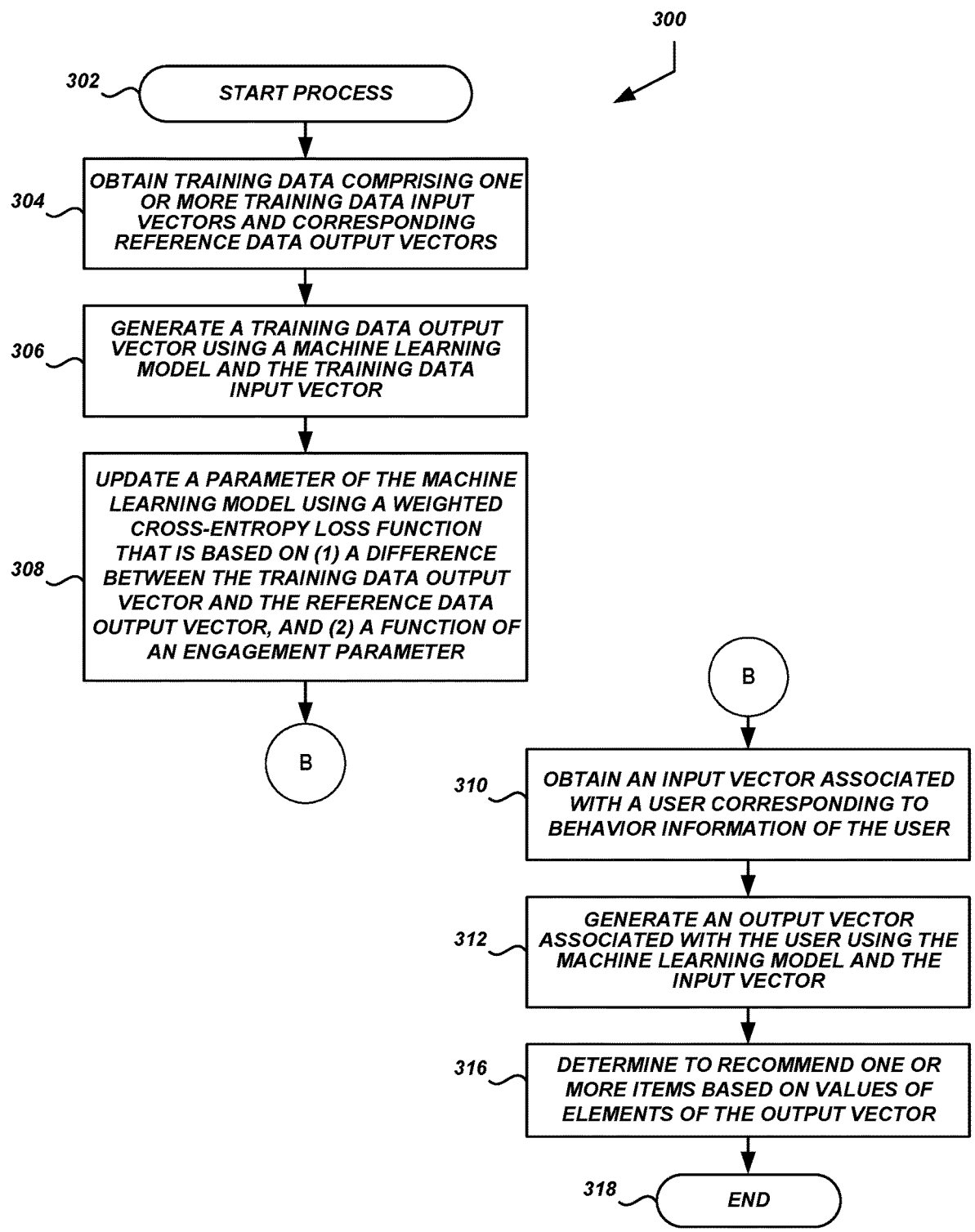
FIG. 3 is a flow diagram of an illustrative process for training a machine learning model using a weighted cross-entropy loss function according to some embodiments.

Example Process for Training a Machine Learning Model Using a Weighted Cross-Entropy Loss Function FIG. 3 is a flow diagram of an illustrative process for training a machine learning model using a weighted cross-entropy loss function according to some embodiments. The process 300 begins at block 302. The process 300 may be embodied in a set of executable program instructions stored on a computer-readable medium, such as one or more disk drives, of a computing system, such as the computing system 600 shown in FIG. 6 and described in greater detail below. When the process 300 is initiated, the executable program instructions can be loaded into memory, such as RAM, and executed by one or more processors of the computing system 600. Although the process 300 is described with respect to the computing system 600 shown in FIG. 6, the description is illustrative only and is not intended to be limiting. In some embodiments, the process 300 or portions thereof may be performed serially or in parallel by multiple computing systems.

At block 304, the computing system 600 or some other computing system can in some embodiments obtain training data for use in training a machine learning model, such as the NN 102' shown in FIG. 1B. In some embodiments, the process performed at block 304 can be similar to the process performed at block 204. At block 306, the computing system 600 or some other computing system can in some embodiments generate a training data output vector using the machine learning model and the training data input vector (or generate training data output vectors using the machine learning model and the training data input vectors). In some embodiments, the process performed at block 306 can be similar to the process performed at block 206.

At block 308, the computing system 600 or some other computing system can in some embodiments update a parameter of the machine learning model using a weighted cross-entropy loss function. An example weighted cross-entropy loss function is shown in equations [3] and [4], above, and equation [6] below:

$$\text{loss} = \text{Cost}(Y, \hat{Y}) + \lambda \cdot \sum_{i=0}^{L} |W_i|^2; \quad [6]$$

$$\text{Cost}W(Y, \hat{Y}) = -\sum_{i=0}^{D-1} ((Fe(i) \cdot y_i \cdot \log(\hat{y}_i) + (1 - y_i) \cdot \log(1 - \hat{y}_i));$$

$$Fe(i) = \begin{cases} m + u \cdot E(i), & E(i) > 0 \\ 1, & \text{otherwise} \end{cases};$$

where Y denotes a reference data output vector; $\hat{Y}$ denotes a training data output vector; $\lambda$ denotes a weighing factor; L denotes the number of weight matrices associated with the machine learning model less one; E denotes an engagement metric; E(i) denotes an engagement parameter of the engagement metric E associated with an item with an index of i; m and u denote hyperparameters associated with the machine learning model; Fe denotes a modification metric; and Fe(i) denotes a modification parameter of the modification metric associated with an item with an index of i. Accordingly, the weighted cross-entropy loss function can be based on (1) a difference between the training data output vector and the reference data output vector (shown in equation [4]) and (2) an engagement parameter or a function of an engagement parameter (shown in equation [3]).

Advantageously, using specific hyperparameter values and the engagement metric used during training, recommendations for a user can be tailored to optimized for both precision and the engagement metric. To modify the balance between precision and user engagement, or to modify the engagement metric, the machine learning model has to be retrained. The computing system 600 can in some embodiments determine whether termination criteria are met. For example, the termination criteria can be based on the accuracy of the machine learning model as determined using the loss function. If so, the process 300 can terminate the training process of the machine learning model and proceed to block 310.

At block 310, the computing system 600 or some other computing system can in some embodiments generate or obtain an input vector (e.g., an input vector that corresponds to behavior information) for the machine learning model. In some embodiments, the process performed at block 310 can be similar to the process performed at block 210. At block 312, the computing system 600 or some other computing system can in some embodiments generate an output vector using the machine learning model and the input vector. In some embodiments, the process performed at block 312 can be similar to the process performed at block 212.

At block 314, the computing system 600 or some other computing system can in some embodiments determine modified values of the element of the output vector based at least in part on an engagement metric. In some embodiments, the computing system 600 or some other computing system can generate an engagement metric based at least in part on a type or property of behavior of one or more users with respect to items. The engagement metric can be the engagement metric E(i) in equation [3]. The engagement metric can include an engagement parameter that represents a business value associated with one item of the plurality of items. Alternatively, or in addition, the engagement metric can include an engagement parameter that represents a viewing duration with respect to an item, a listening duration with respect to an item, a watching duration with respect to an item, an interaction with content regarding the item (e.g., clicking on an image representing the item), or any combination thereof. In some embodiments, an engagement parameter can be expected revenue.

In some embodiments, computing system 600 or some other computing system can determine modified values of elements of the output vector based at least in part on an engagement metric and one or more hyperparameters of the machine learning model. For example, values of elements of the output vector can be modified and re-ranked using the modification metric Fe(i) shown in equation [3], which is based on the engagement metric E(i) and two hyperparameters m and u.

At block 316, the computing system 600 or some other computing system can in some embodiments determine to recommend one or more items based at least partly on the modified values. For example, as illustrated with reference to table 1, an output vector can include three elements corresponding to predicted probabilities of a user interacting with items 1, 2, and 3. Modified values of the three elements can be 0.9, 0.5, and 1 respectively. With re-ranking, the top item recommended would be item 3. In some embodiments, the items recommended can be associated with modified values that are above a recommendation threshold or items with top n modified values. In some embodiments, if a user has interacted with an item, the item is not recommended to the user even if the item is associated with a high modified value. The process 300 ends at block 318.

Although the steps of the process 300 are shown to be performed sequentially in FIG. 3, this order is illustrative only, and is not intended to be limiting. The process 300 or portions thereof may be performed serially or in parallel by one or more computing systems. In some embodiments, the process 300 can comprise two processes: one process comprising the steps illustrated in blocks 302-308, and another process comprising the steps illustrated in blocks 310-316. The two processes can be performed sequentially, in parallel, synchronously, or asynchronously. The two processes may be performed independently of each other. In some embodiments, one process may be performed once while the other process may be performed multiple times. For example, the process comprising the steps shown in blocks 302-308 may be performed daily or weekly (e.g., when new behavior information becomes available), while the process comprising the steps shown in blocks 310-316 may be performed more or less frequently (e.g., to generate recommendations when a user accesses a network resource).

Figure 4:
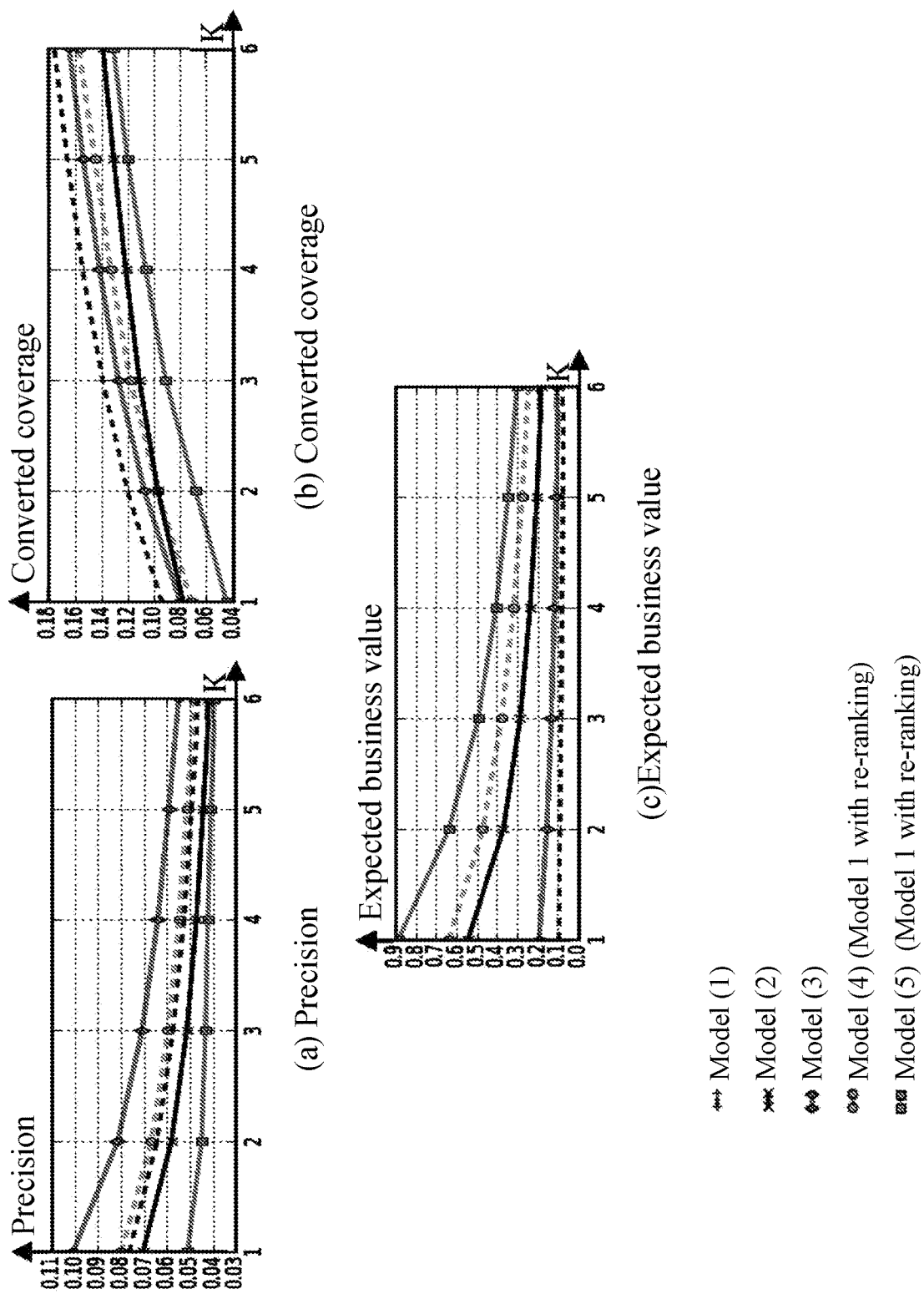
FIG. 4 shows plots of example accuracy metrics for recommendations using neural network models trained using a cross-entropy loss function or a weighted cross-entropy loss function and neural network models trained using a cross-entropy loss function with output modified by re-ranking.

Example Precision, Converted Coverage, and Expected Business Value with Re-Ranking FIG. 4 shows plots of example accuracy metrics for recommendations using neural network models trained using a cross-entropy loss function or a weighted cross-entropy loss function and neural network models trained using a cross-entropy loss function with output modified by re-ranking. In FIG. 4, panels (a)-(c) show the precision, converted coverage, and expected business value, respectively, along the vertical axis for the top 1 to 6 recommendations, along the horizontal axis, using five models.

NN model (1) (based on equations [1], [2], [4], and [5]) with one hidden layer and sigmoid activation function is marked by dashed line with crosses in FIG. 4. The results of A/B test of this model vs. baseline collaborative filtering are shown in Table 2.

TABLE 2

A/B test results.

| NN model | Expected engagement increase [%], (p-value) | Interactions increase [%], (p-value) |
| --- | --- | --- |
| Model (1) | −0.51 (p = 0.256) | +1.56 (p = 0.000) |
| Model (3) With re-ranking | +2.07 (p = 0.026) | +1.30 (p = 0.000) |

Model (1) had higher number of interactions, but expected engagement was reduced in comparison to a baseline recommender (with high p value). Model (3) was a result of hyper-parameters optimization of model (1). A neural network with one hidden layer and a Relu activation function (solid line with diamonds in FIG. 4) had better performance than model (1): higher precision and expected revenue, but lower converted coverage.

Model (1) was modified by adding the expected engagement of recommended items into optimization. Three models were introduced. The first one is a NN model, model (2), with a weighted cross-entropy loss function (based on equations [3], [4], and [6]), and a Relu activation function. The performance of model (2) is marked by solid line with crosses in FIG. 4. The other two models, models (4)-(5), include a Relu activation function and re-ranking (based on equations [3]-[5]). Model (4) had m=1; u=0.1 (dashed line with circles) for re-ranking. Model (5) had m=1; u=0.5 (solid line with boxes) for re-ranking. Models (4)-(5) show how precision and expected revenue were changing depending on re-raking parameters. Converted coverage @1 of model (5) with (m=1; u=0.5) (solid line with boxes in FIG. 2 *b*) was reduced by two times as soon as the expected engagement became higher than 0.7. In some embodiments, it can be advantageous to have converted coverage as close as possible to that of model (3) (solid line with diamonds in FIG. 4). Therefore, parameters (m, u) which increase expected engagement more than 0.7 may be undesirable.

Model (2) Relu neural network with weighted cross-entropy loss function (solid line with crosses in FIG. 4) had lower precision and higher expected revenue than Model (3) Relu neural network (solid line with diamonds in FIG. 4). By selecting different parameters (m; u) of equation [3], precision and expected engagement can be optimized. However, with Model (2), the model has to be re-trained every time parameters (m, u) are changed.

Training one model and then re-ranking the output scores of this model for getting higher engagement or precision depending on production requirements may be advantageous. FIG. 4 shows that by adjusting (m; u) expected engagement can be achieved, but at the cost of reduction of precision. For better understanding of a tradeoff between precision and expected engagement, dependence of precision on expected engagement @1 (top 1 item recommendation) in FIG. 5, panel (a), and dependence of converted coverage on expected engagement @1 in FIG. 5, panel (b).

Figure 5:
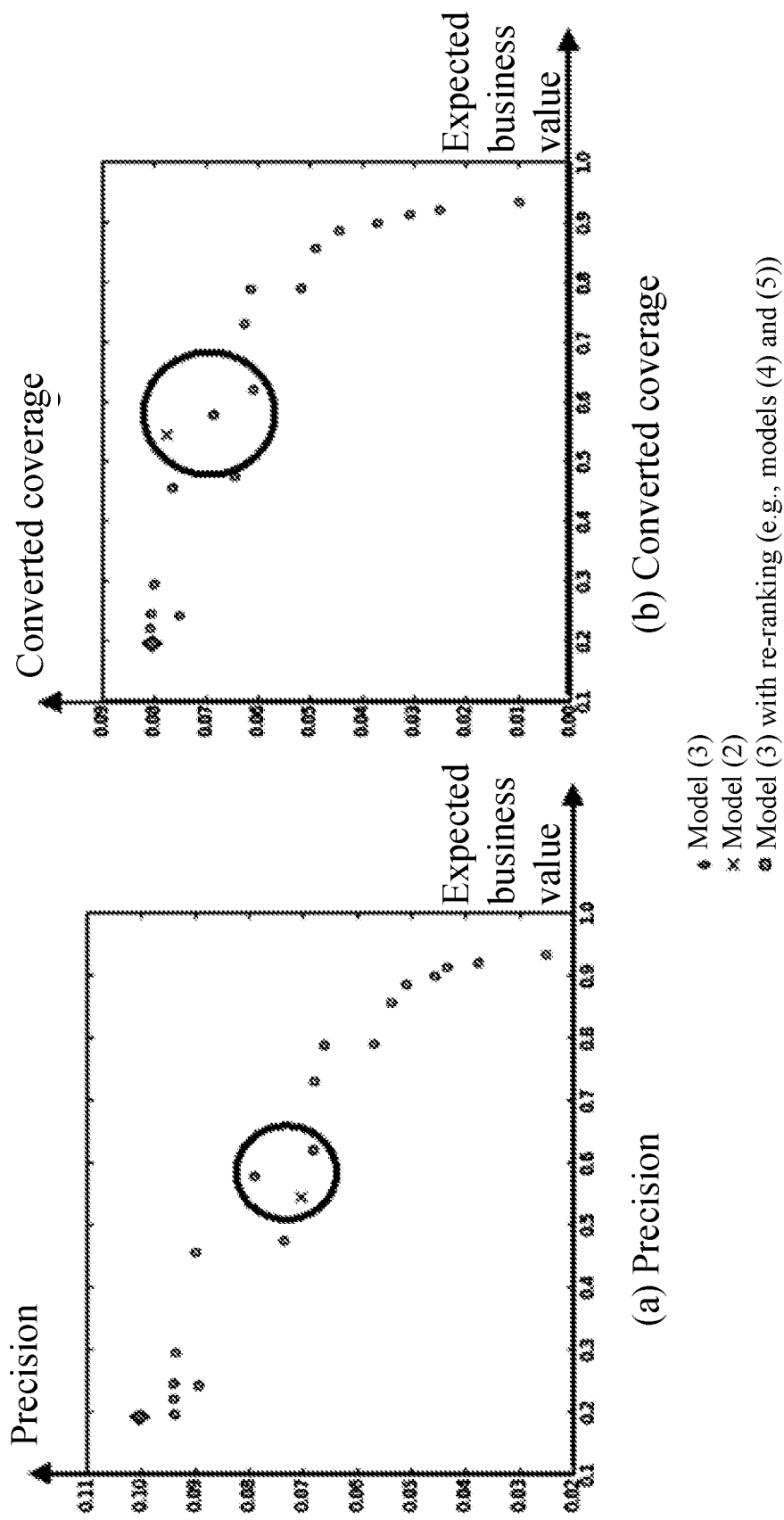
FIG. 5 shows plots of example accuracy metrics for recommendations using a neural network model trained using a cross-entropy loss function, a neural network model trained using a weighted cross-entropy loss function, and neural network models trained using a cross-entropy loss function with output modified by re-ranking using different parameters.

FIG. 5 shows plots of example accuracy metrics for recommendations using a neural network model trained using a cross-entropy loss function, a neural network model trained using a weighted cross-entropy loss function, and neural network models trained using a cross-entropy loss function with output modified by re-ranking using different parameters. Crosses in FIG. 5 belong to a model (2) with a Relu activation function. Model (2) corresponds to a precision and expected engagement @1 of a Relu NN model (2) in FIG. 2 (solid line with crosses). Circles in FIG. 5 belong to model (3) with re-ranking, where re-ranking parameters (m,u) were uniformly sampled such that m∈1 . . . 4 and u∈0 . . . 2. The diamond in FIG. 5, panel (a) corresponds to precision and expected revenue @1 of model (1) with a Relu activation function in FIG. 4 (solid line with diamonds). It is also equivalent to a Relu model (3) with re-ranking where m=1 and u=0 (e.g., without re-ranking). Performance of model (2), highlighted by black crosses on FIG. 5, can be reproduced by model (3) with re-ranking. The area where both models have similar performance is highlighted by black circle in FIG. 3. This area was selected because it gave three times increase of expected engagement (from 0.2 to 0.6) and not significant reduction in precision (from 0.10 to 0.07) as shown in FIG. 5, panel (a), and minor loss in converted coverage in FIG. 5, panel (b) in comparison with the NN model (1) with no re-ranking (blue diamonds in FIG. 5).

Table 2 also shows A/B test results of model (1) and model (3) with re-ranking. NN model (1) (based on equations [1], [2], [4], and [5]) with one hidden layer and sigmoid activation function is marked by dashed line with crosses in FIG. 4. Results of A/B test of this model vs. baseline collaborative filtering are shown in Table 2. Model (1) had higher number of interactions, but expected engagement was reduced in comparison to a baseline recommender (with high p value). Model (3) was a result of hyper-parameters optimization of model (3). Parameters m, u were selected so that precision and expected engagement belong to the black circle area in FIG. 3.

Execution Environment

Figure 6:
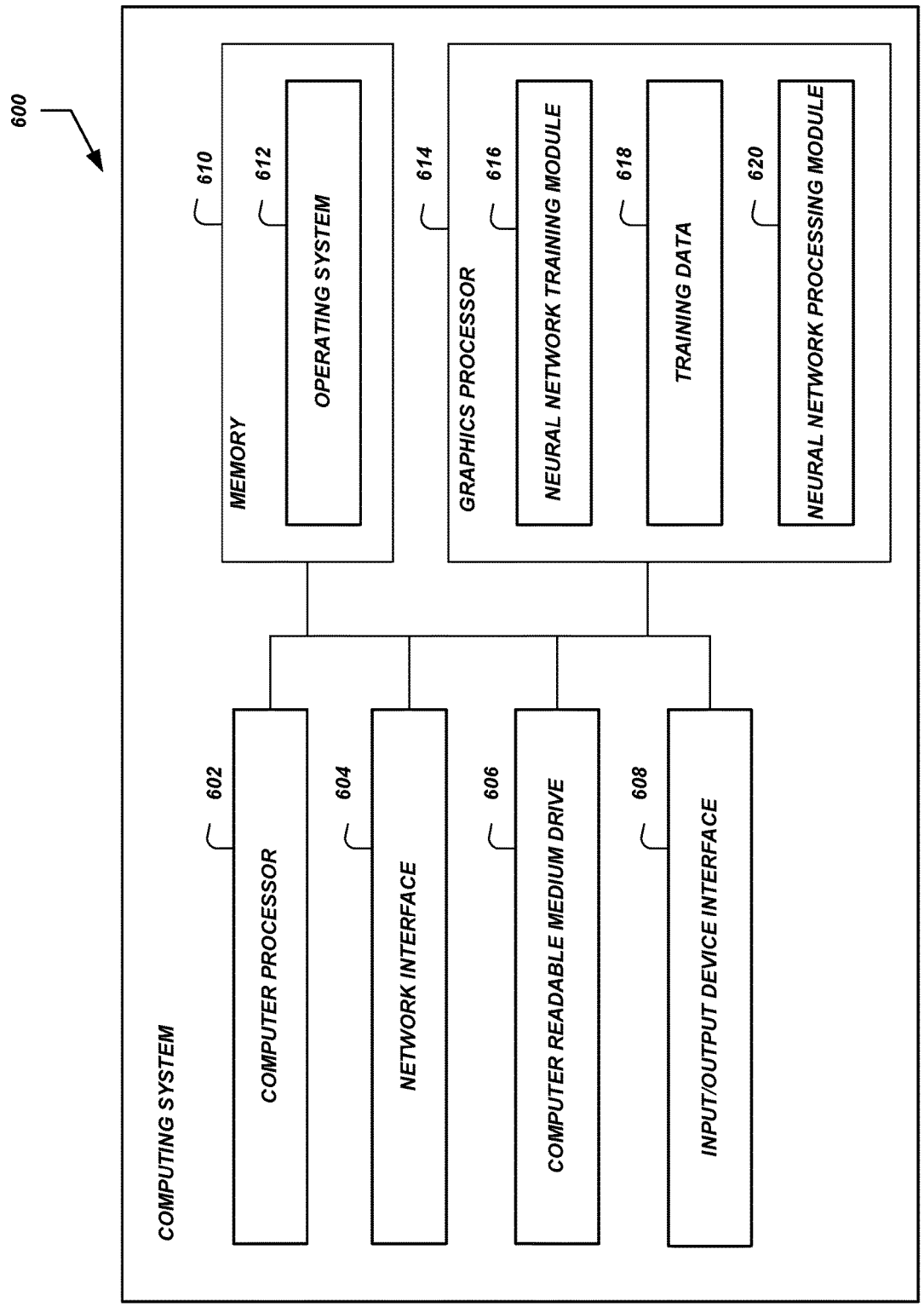
FIG. 6 is a block diagram of an illustrative computing system configured to implement training and processing of artificial neural networks according to some embodiments.

FIG. 6 illustrates an example computing system 600 that may be used in some embodiments to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as high density disks ("HDDs"), solid state drives ("SDDs"), flash drives, and/or other persistent non-transitory computer-readable media; an input/output device interface 608, such as an IO interface in communication with one or more microphones; one or more computer readable memories 610, such as random access memory ("RAM") and/or other volatile non-transitory computer-readable media; and one or more graphical processors 614, such as graphics processing units ("GPUs").

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure.

In some embodiments, the graphics processor 614 can include graphics memory such as random access memory ("RAM"). The graphics memory may include a NN and/or computer program instructions that the graphics processor 614 executes in order to implement one or more embodiments. For example, in one embodiment, the graphics memory may include a neural network training module 616 that performs the process 200 and/or 300 described above (or portions thereof) to obtain, generate, or otherwise process training data 618, train a neural network with the obtained, generated, or otherwise processed training data, and use the trained neural network for determining recommendations for users. In some embodiments, the training data 618 currently being processed by the NN may also be stored in the graphics memory, while the remainder of the training data can be stored in some other location, such as memory 610, a computer-readable medium drive 606, a network-accessible data store, etc. As another example, the graphics memory may include a neural network processing module 620 that performs portions of the process 200 and/or 300 described above to process the neural network generated by, for example, the neural network training module 616. In some implementations, the computing system 600 can include both the neural network training module 616 and the neural network processing module 620. In some implementations, the computing system 600 can include one of the neural network training module 616 or the neural network processing module 620. In some embodiments, multiple computing systems 600 may communicate with each other via their respective network interfaces 604, and can implement neural network training or processing separately (e.g., each computing system 600 may execute one or more separate instances of the processes 200 and/or 300), in parallel (e.g., each computing system 600 may execute a portion of a single instance of a process 200 and/or 300), etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more hardware-based processors programmed by the executable instructions to at least:
      obtain training data for an artificial neural network, wherein the training data for the artificial neural network comprises a training data input vector and a corresponding reference data output vector, wherein an element of the training data input vector corresponds to data representing a first property of behavior of a first user with respect to a first item of a plurality of items during a first time period, and wherein an element of the reference data output vector corresponds to data representing the first property of behavior of the first user with respect to a second item of the plurality of items during a second time period;
      generate an output vector during training using the artificial neural network and the training data input vector;
      compute a difference between the output vector generated during training and the reference data output vector;
      update a parameter of the artificial neural network using the difference between the output vector generated during training and the reference data output vector;
      obtain an input vector associated with a second user, wherein an element of the input vector corresponds to data representing the first property of behavior of the second user with respect to the first item;
      generate an output vector during prediction associated with the second user using the artificial neural network and the input vector, wherein an element of the output vector generated during prediction corresponds to a probability of interaction with content regarding an item of the plurality of items, wherein the element corresponds to the second item;
      determine a function of an engagement parameter based at least on one of (1) a second property of behavior of one or more users with respect to the second item, and (2) a property of the second item, wherein the second property of behavior is different than the first property of behavior;
      determine a modified value of the element of the output vector during prediction based at least partly on the function of the engagement parameter; and
      determine to recommend the second item based at least partly on the modified value.

2. The system of claim 1, wherein the instructions to determine to recommend the second item comprise instructions to determine to recommend the second item with the modified value of the element of the output vector generated during prediction that is above a recommendation threshold.

3. The system of claim 1, wherein the instructions to determine to recommend the second item comprise instructions to determine to recommend the second item with the modified value of the element of the output vector generated during prediction that is one of the n highest modified values of elements of the output vector generated during prediction, wherein n is a positive number.

4. The system of claim 1, wherein the instructions to determine to recommend the second item comprise instructions to:
   determine the element of the input vector associated with the second user corresponds to data representing the second user having had an interaction with content regarding the first item;
   determine the first item comprises the second item; and
   determine to recommend a third item of the plurality of items.

5. A computer-implemented method comprising:
under control of a computer system comprising one or more hardware processors configured to execute specific computer-executable instructions,
obtaining a machine learning model trained, using first input data associated with an occurrence of a first type of event with respect to a first item, to generate first output data representing a first predicted occurrence of the first type of event with respect to a second item;
obtaining an input vector comprising second input data associated with an occurrence of the first type of event with respect to the first item;
generating an output vector using the machine learning model and the input vector, wherein the output vector comprises second output data representing a second predicted occurrence of the first type of event with respect to the second item;
computing a function of an engagement metric representing a second type of event associated with the second item;
modifying a value of the output vector, based at least partly on the function of the engagement metric representing a second type of event associated with the second item, to generate a modified value; and
determining to recommend the second item based at least partly on the modified value.

6. The computer-implemented method of claim 5, wherein obtaining the machine learning model comprises training at least one of: a non-classification model, a neural network, a recurrent neural network (RNN), a logistic regression model, a decision tree, a support vector machine, a Naïve Bayes network, a k-nearest neighbors (KNN) model, a random forest model, or a combination thereof.

7. The computer-implemented method of claim 5, wherein computing the function of the engagement metric is based at least partly on a business value associated with the second item.

8. The computer-implemented method of claim 5, wherein computing the function of the engagement metric is based at least partly one at least one of: a viewing duration with respect to the second item, a listening duration with respect to the second item, a watching duration with respect to the second item, an interaction with content regarding the second item, or any combination thereof.

9. The computer-implemented method of claim 5, wherein modifying the value of the output vector comprises modifying the value of the output vector based at least partly on the function of the engagement metric and at least one hyperparameter of the machine learning model.

10. The computer-implemented method of claim 9, further comprising determining a value of the at least one hyperparameter of the machine learning model.

11. The computer-implemented method of claim 10, wherein the at least one hyperparameter comprises two hyperparameters of the machine learning model, and wherein determining the value of the at least one hyperparameter of the machine learning model comprises determining values of the two hyperparameters to maximize accuracy of the machine learning model and business values associated with items corresponding to elements of the output vector.

12. The computer-implemented method of claim 9, wherein modifying the value of the output vector based at least partly on the function of the engagement metric comprises:
multiplying a first hyperparameter of the at least one hyperparameter of the machine learning model with the value of the engagement metric that corresponds to the second item to generate an intermediate modification value associated with the second item;
adding a second hyperparameter of the at least one hyperparameter of the machine learning model to the intermediate modification value to generate a final modification value associated with the second item; and
multiplying the value of the element of the output vector with the final modification value to generate the modified value.

13. The computer-implemented method of claim 5, wherein obtaining the machine learning model comprises training the machine learning model using the first input data associated with an occurrence of at least one of: a viewing event associated with respect to the first item, a listening event with respect to the first item, a watching event with respect to the first item, an interaction with content regarding the first item, or any combination thereof.

14. A system comprising:
computer-readable memory storing executable instructions; and
one or more processors programmed by the executable instructions to at least:
obtain a machine learning model generated using first input data associated with:
an occurrence of a first type of event with respect to a first item; and
an engagement metric representing a second type of event associated with a second item;
obtain an input vector associated with a user;
generate an element of an output vector using the machine learning model the input vector, the engagement metric, and a hyperparameter of the machine learning model; and
determine to recommend the second item to the user based at least partly on the output vector.

15. The system of claim 14, wherein the instructions to obtain the machine learning model comprise instructions to:
obtain training data comprising a training data input vector and a corresponding reference data output vector;
generate an output vector during training using the machine learning model and the training data input vector;
compute a difference between the output vector generated during training and the reference data output vector using a cost function based on a modification comprising the engagement metric; and
update a parameter of the machine learning model using the difference between the output vector generated during training and the reference data output vector.

16. The system of claim 15, wherein the instructions to compute the difference using the cost function comprise instructions to compute the difference using the cost function comprising a weighted cross-entropy cost function.

17. The computer-implemented method of claim 16, wherein the cost function is based at least partly on the value of the engagement metric and at least one hyperparameter of the machine learning model.

18. The system of claim 14, wherein the instructions to obtain the machine learning model comprise instructions to modify an element of an output layer of the machine learning model, based on the engagement metric, to generate a corresponding element of a modified output layer of the machine learning model.

19. The system of claim 18, wherein the instructions to modify the element of the output layer comprise instructions to modify the element of the output layer of the machine learning model, based on the engagement metric and a hyperparameter of the machine learning model, to generate the corresponding element of the modified output layer of the machine learning model.

* * * * *

UNITED STATES PATENT AND TRADEMARK OFFICE
CERTIFICATE OF CORRECTION

PATENT NO. : 10,997,500 B1  
APPLICATION NO. : 15/603037  
DATED : May 4, 2021  
INVENTOR(S) : Vishnu Narayanan et al.

Page 1 of 1

It is certified that error appears in the above-identified patent and that said Letters Patent is hereby corrected as shown below:

In the Specification

Column 6, Line 48, delete "Y" and insert --$\hat{Y}$--.

Column 16, Line 67, delete "SDDs" and insert --SSDs--.

In the Claims

Column 20, Claim 3, Line 55, delete "the n highest" and insert --the highest--.

Column 20, Claim 4, Line 63, delete "having had" and insert --based at least partly on--.

Column 21, Claim 8, Line 42, delete "one at least one of:" and insert --on--.

Column 22, Claim 14, Line 34, delete "model" and insert --model,--.

Column 22, Claim 17, Line 34, delete "computer-implemented method" and insert --system--.

Signed and Sealed this  
Sixth Day of July, 2021

Drew Hirshfeld  
*Performing the Functions and Duties of the  
Under Secretary of Commerce for Intellectual Property and  
Director of the United States Patent and Trademark Office*